Figure 1:
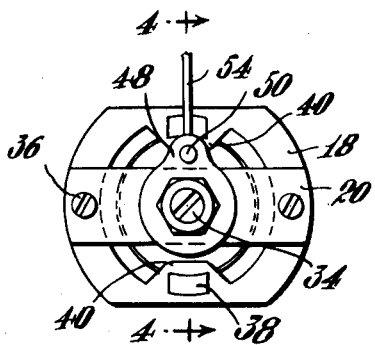

June 7, 1960  R. A. AMMON  2,940,045
METHOD OF FORMING A MOVING COIL INSTRUMENT CORE
Filed May 28, 1957

Inventor
Roscoe A. Ammon
by Roberts, Cushman & Grover
Attys

United States Patent Office 2,940,045
Patented June 7, 1960

2,940,045

METHOD OF FORMING A MOVING COIL INSTRUMENT CORE

Roscoe A. Ammon, Manchester, N.H., assignor, by mesne assignments, to Minneapolis-Honeywell Regulator Company, a corporation of Delaware Filed May 28, 1957, Ser. No. 662,175

4 Claims. (Cl. 324—151)

The present invention relates to electrical instruments and particularly to a method of forming a core unit used in magnetic field assemblies for moving coil instruments such as meters and sensitive relays.

Instruments of this general type comprise a yoke and core assembly, either the yoke or core being magnetized and the other providing a magnetic flux path for concentrating the magnetic field in an air gap between the yoke and core. Such instruments have means provided for positioning the core relative to the yoke so that a coil, supported on bearings, may rotate in the air gap.

A particular type of such instruments has a U-shaped yoke of magnetic material with arcuate poles normal to the base of the yoke. A frame of non-magnetic material is fitted in the yoke between the poles and has posts normal to the yoke base. A magnetic core is slidably fitted between the posts of the frame and between the poles of the yoke. The core is usually made of very hard Alnico alloy which is highly oriented and permanently magnetic. Since such cores are very hard, they are difficult to machine and thus are hard to accurately locate and retain between the poles of the yoke. These cores usually have diametric magnetic axis which must be accurately aligned with respect to the poles and which thus must be restricted against rotation as well as translation. Machining of these cores, in addition to being very difficult, adversely affects the magnetic flux within the air gap between the core and the poles. The high orientation of such cores gives a highly concentrated flux at the poles whereas in some cases, it is desirable that the flux be more uniformly distributed around the core.

The principal object of this invention is to provide a method for making improved field assemblies for moving coil instruments wherein the core is accurately positioned and retained between the poles of a yoke without need for machining the core. Further objects are to provide a method for accurately positioning and retaining the magnetic axis of a magnetic core relative to the poles of a yoke and concomitantly to provide a method of distributing the magnetic flux more uniformly about the core. A still further object is to provide improved field assemblies containing such cores.

In accordance with this invention, a method of forming an arcuate positioning member having oppositely directed shoulders on a core having an arcuate pole face and a magnetic axis extending therethrough comprises the steps of determining the magnetic axis of said core and locating said shoulders in predetermined angular relation to said determined axis.

Preferably the arcuate member having oppositely directed shoulders is fitted to the core, the resultant magnetic axis determined, and the shoulders located in predetermined relation to the magnetic axis subsequent to the determination of said axis. The positioning member is preferably made of a magnetic material such as soft iron.

In a further aspect the invention comprises a completed core magnet having an arcuate pole face and a diametric magnetic axis extending therethrough, and positioning means on the core including an arcuate member secured on the face of the core, said member forming oppositely directed shoulders at the periphery of said core in predetermined relation to the magnetic axis of the core.

Figure 3:
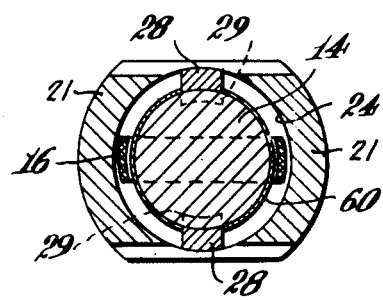
Figure 2:
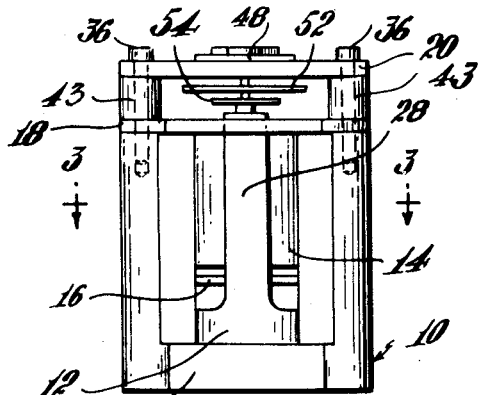
Figure 4:
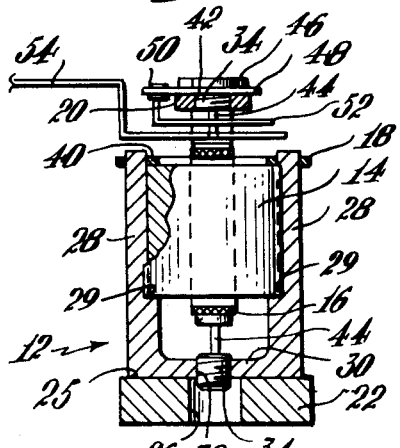
Figure 5:
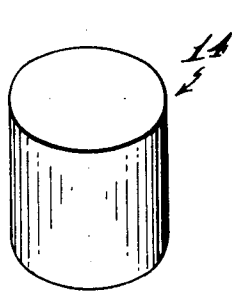
Figure 6:
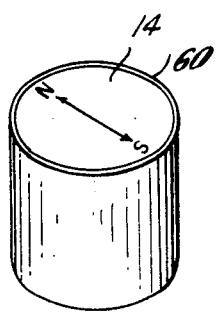
Figure 7:
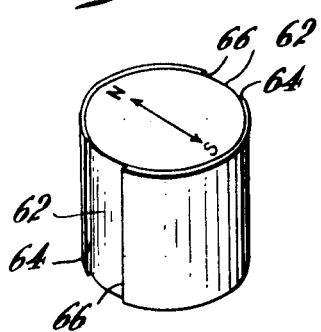

A specific embodiment of this invention is illustrated in the accompanying drawings in which:

Fig. 1 is a plan view of an assembled moving coil electrical instrument;
Fig. 2 is a front view of the assembled instrument;
Fig. 3 is a section on the line 3—3 of Fig. 2;
Fig. 4 is a section on the line 4—4 of Fig. 1;
Fig. 5 is an isometric view of a core;
Fig. 6 is an isometric view of a core with a solid sleeve inserted thereover; and
Fig. 7 is an isometric view of the core and sleeve with locating slots cut therein.

Referring to the drawings the instrument comprises a yoke 10 of magnetic material, a non-magnetic frame 12, a permanently magnetized core 14 having poles N and S, a moving coil 16, a retaining plate 18, and a bridge 20. The yoke 10 is U-shaped and has two opposed poles 21 extending normally from the base portion 22. The poles 21 have inner pole faces 24 curved concentrically with an axis to be described more fully hereinafter and the base portion 22 has a planar inner surface 25 and an access opening 26.

The frame 12, similarly to the yoke 10, comprises opposed posts 28 normal to a transverse portion 30. The posts 28 have inner surfaces curved about an axis and have inwardly projecting shoulders 29 forming a socket to receive the cylindrical core 14 and to limit its downward movement. The base portion 30 has an opening 32 concentric with the curved inward faces of the posts 28 to receive a threaded conventional jewel bearing screw 34.

The curved inner faces 24 of the yoke poles, the base portion 30 of the frame, the inner surfaces of the posts 28, and the bearing opening 32 are formed, preferably by machining, concentric with a single axis, namely the axis of the core 14. The frame base 30 and the yoke base 22 are substantially of the same diameter so that the base 30 fits snugly between the faces 24 and rests on the planar surfaces 25 of the yoke. Similarly the inner faces of the frame posts 28 are substantially of the same diameter as the core 14 so that the latter fits snugly within the socket formed by said inner faces and is precisely positioned coaxially with the bearing opening 32.

The above-described field assembly is locked in assembled condition by a locking plate 18 and a bridge 20 by means of screws 36 engaging threaded openings in the poles 21 of the yoke. The locking plate 18 has slots 38 therein which receive and lock in position the posts 28 of the frame 12. The locking plate 18 also has fingers 40 projecting over the end of the core 14 and engaging a surface thereof to retain the core against projecting shoulders 29 of the posts 28. The bridge 20 has a threaded bore 42 for receiving another bearing screw 34 like that in the opening 32 of frame 12. The locking plate 18 and the bridge 20 are spaced apart by means of spacers 43.

The coil 16 comprising a form around which are wound turns of wire, carries pivot staffs 44 which engage the jewel bearings 34. The opening 26 in the yoke 10 provides access to the lower bearing screw 34 in the base 30 of the non-magnetic frame 12 as shown in Fig. 4. The upper bearing screw 34 is locked in position by a nut 46 and a plate 48. The plate 48 carries an adjusting lever 50 which connects with one end of a coiled spring 52, the other end of the coiled spring being connected to the upper pivot staff 44 as is conventional in the meter art. The upper pivot staff 44 also carries a recording pointer 54 to indicate the position of the coil between the yoke poles.

The core 14 is provided with a sleeve 60 of a magnetic material, preferably soft iron, which is secured to the core by suitable means, for example by soldering. The sleeve 60 as illustrated in Figs. 3 and 7 has vertical slots 62 providing oppositely directed shoulders 64 and 66 which extend through the wall of the sleeve 60 substantially to the core 14. The slots 62 slidably engage the non-magnetic frame posts 28 and accurately position and retain the core in the yoke 10. The core 14 is thus held within the yoke by resting against abutment shoulders inwardly projecting from the posts 28, by the slots 62 in the sleeve 60 which engage the posts 28 normal to the yoke base 22, and by the fingers 40 in the retaining plate 18 which hold the core against the abutment shoulders.

While a sleeve 60 may be made of any suitable material, a magnetic material is preferred. Permanently magnetic cores have highly concentrated flux fields which a magnetic sleeve advantageously distributes around the circumference of the core without appreciably weakening the flux strength within the air gap between the poles of the yoke and the core. In addition to advantageously distributing the magnetic flux, such sleeves must be provided because the materials used to make the permanent magnet core (principally Alnico alloys) are too hard to conveniently machine.

While the shoulder-defining slots can be provided within the sleeve by any convenient means, it is preferred that a solid sleeve be first secured to the core, the magnetic axis of the resulting combination be then accurately located, with the slots subsequently machined in the sleeve to properly position the magnetic axis between the yoke cores. This method of securing the sleeve and the slots to the core is preferred because the sleeve will sometimes cause slight shifts of the magnetic axis of the magnetic core and it thus assures that the slots will be accurately located with respect to the resultant magnetic axis. In practice the steps of locating the magnetic axis of the combination by pivotally mounting the same in a magnetic field and the milling of the slots are best performed in a single apparatus to accurately assure the location of the axis with respect to the slots. For example, the combined core and sleeve are pivotally mounted in the magnetic field, allowed to rotate into alignment therewith, clamped, and the slots cut in predetermined position relative to the magnetic axis. When sleeves of magnetic material are used, it is necessary that the slots extend substantially through the thickness thereof to the face of the core to avoid the provision of a shunt path about the circumference of the core which would diminish the flux strength in the air gap between the core and the yoke poles.

While this invention has been illustrated with a sleeve having opposed positioning slots cut therein, it should be noted that substantially the same result can be achieved with a singe slot or by providing one or more circumferentially spaced, arcuate shoes whose ends define the desired positioning shoulders.

It should be understood that this disclosure is for the purpose of illustration only and that the invention includes all equivalents and modifications which fall within the scope of the appended claims.

I claim:

1. A field assembly for a moving coil electrical instrument comprising a yoke having means forming opposed pole faces and a transverse portion at one end integral with and normal to said pole faces, a unitary frame having opposed posts of non-magnetic material normal to said transverse portion of said yoke and at one end a base including means fitting in said yoke and means forming a socket between the posts, and a cylindrical, permmanently magnetic core slidably fitting said posts between said poles, said posts extending substantially the length of the core, the core having thereon a sleeve of magnetic material with longitudinal slots receiving said posts, said slots extending through the thickness of the sleeve substantially to the surface of the core, and means for retaining the core and frame members in the yoke, whereby a rugged, compact field assembly is provided with the core accurately positioned and rigidly held within the yoke.

2. A field assembly according to claim 1 further characterized in that said sleeve comprises a plurality of spaced arcuate shoes permanently secured to the core, the spacing between the ends thereof defining the slots receiving the frame posts.

3. The method of forming means for accurately positioning, in a moving coil electrical instrument, a cylindrical permanent magnet core having arcuate pole faces through which a magnetic axis extends, comprising the steps of securing around the core and over said faces a snugly fitting sleeve of magnetic material, magnetically locating the position of the resultant magnetic axis of said core and sleeve, and subsequently cutting slots substantially entirely through said sleeve to said core thereby to form opposed shoulders in predetermined angular relation to said resultant magnetic axis.

4. The method according to claim 3 characterized in that the position of said resultant magnetic axis is located by pivotally mounting the core and sleeve in a magnetic field and allowing the core and sleeve to rotate into alignment with the field, then clamping the core and sleeve in fixed relation in the magnetic field prior to cutting said slots.

References Cited in the file of this patent

UNITED STATES PATENTS

| | | |
|---|---|---|
| 1,022,795 | McClair | Apr. 9, 1912 |
| 1,927,346 | Lawrence | Sept. 19, 1933 |
| 2,380,609 | Pearce | July 31, 1945 |
| 2,408,060 | Grace | Sept. 24, 1946 |
| 2,607,812 | Lederer | Aug. 19, 1952 |
| 2,719,267 | Kunz | Sept. 27, 1955 |
| 2,808,567 | Lederer | Oct. 1, 1957 |

OTHER REFERENCES

Publication, "Marion Coaxial Mechanisms," copyright 1954 by Marion Electrical Instrument Co.